April 21, 1942.  E. CARLSON  2,280,372
AGRICULTURAL IMPLEMENT
Filed Dec. 11, 1939  2 Sheets-Sheet 1
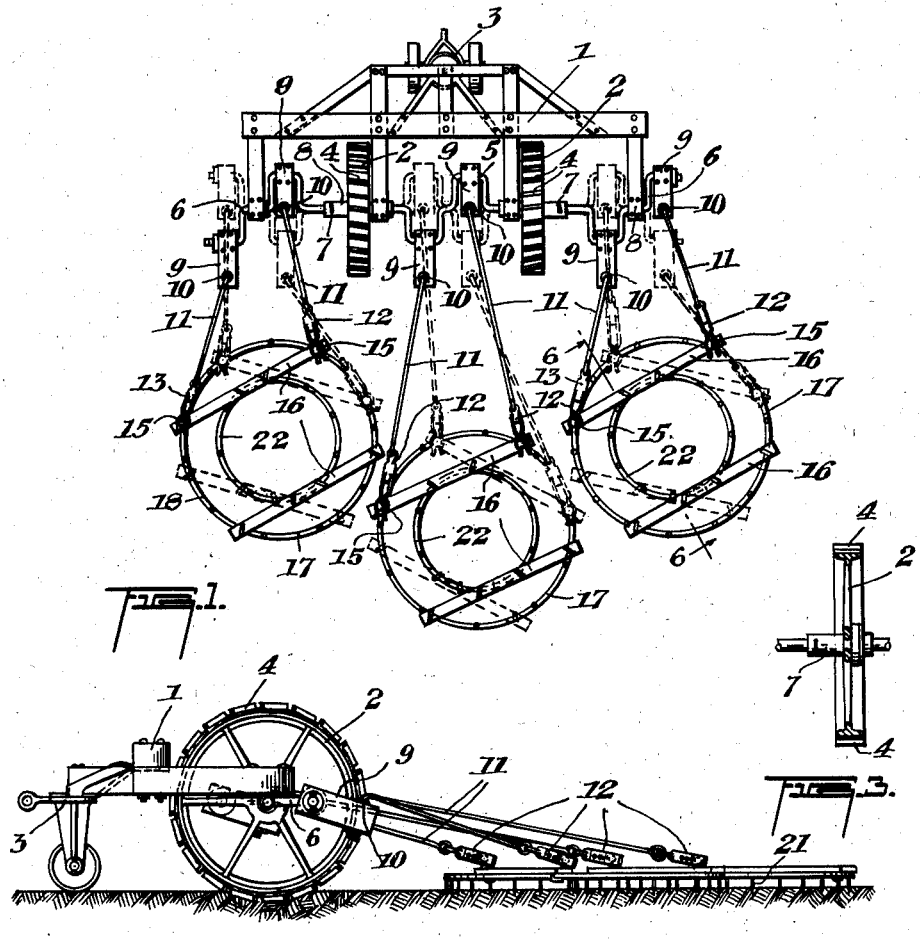
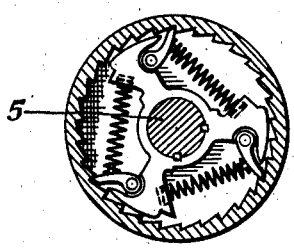
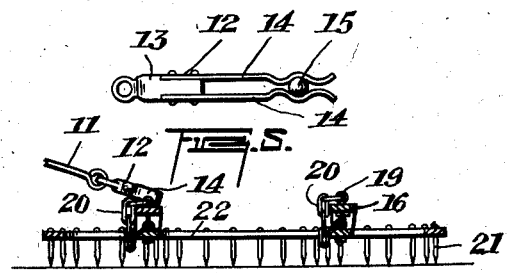
INVENTOR
ELMER CARLSON
By Eugene E. Stevens
ATTORNEY April 21, 1942.  E. CARLSON  2,280,372
AGRICULTURAL IMPLEMENT
Filed Dec. 11, 1939  2 Sheets-Sheet 2
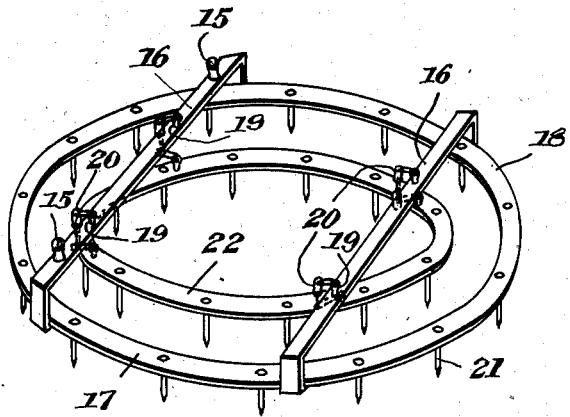
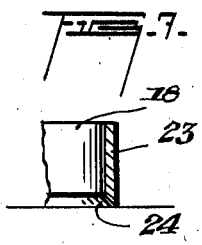
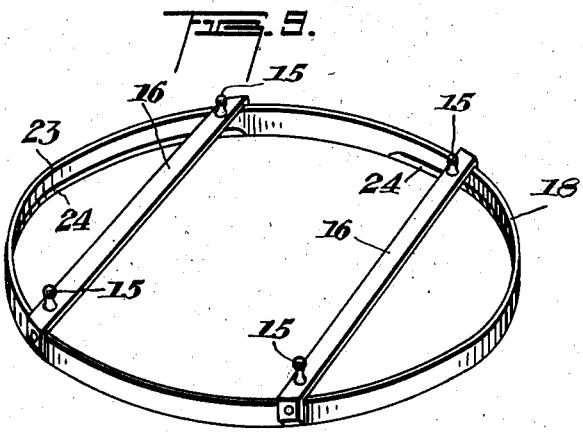
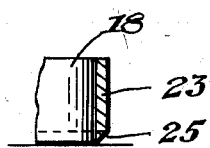
INVENTOR
ELMER CARLSON
BY Eugene E. Stevens
ATTORNEY Patented Apr. 21, 1942

2,280,372

UNITED STATES PATENT OFFICE 2,280,372

AGRICULTURAL IMPLEMENT

Elmer Carlson, Wetaskiwin, Alberta, Canada

Application December 11, 1939, Serial No. 308,701
In Canada September 9, 1939

3 Claims. (Cl. 55—3)

This invention relates to agricultural implements of the kind in which drags are used for cultivation of the soil.

Hitherto certain difficulties have arisen from the fact that harrow drags of known form tend to clog in certain soil conditions, while weeders of known type show a tendency to "bunch," that is, to distribute the weeds in clumps on the surface of the soil. Both of these tendencies are objectionable, the first for obvious reasons, and the second, because when weeds are left together in bunches, instead of drying up as normally would occur if they were left scattered singly, they take root again in the soil, and the object of the weeder is defeated.

It is an object of the present invention to provide an improved cultivator that may be used for either harrowing or weeding and which in both functions eliminates the above mentioned difficulties and disadvantages.

It is also an object of the present invention to provide a harrow capable of performing a complete and efficient breaking and mixing of the soil.

According to the present invention there is provided an agricultural implement comprising a hauling frame and a cultivating drag adapted to be hauled thereby, means for connecting the drag to the frame at two spaced points on the latter and means on the frame for imparting a reciprocating rotary motion to the drag upon forward motion of the implement. Thus, for example, the drags may be connected to crank members on the frame which crank members revolve on forward movement of the implement and impart a reciprocating rotary motion to the drags. Very satisfactory results have been obtained by using interchangeable drags of circular shape.

A preferred embodiment of the invention will now be described with reference to the accompanying drawings given for purposes of illustration only.

Referring to the drawings:

Figure 1 is a plan of the implement.

Figure 2 is a side elevation of the complete implement.

Figure 3 is a vertical section of one of the wheels of the implement.

Figure 4 shows a detail of the dog structure used on the wheels in order to allow the crank member to rotate only when the implement is moving forward.

Figure 5 is a detail of the safety release by means of which the drag is connected to the crank member.

Figure 6 is a vertical section of a harrowing drag showing the construction and connections used.

Figure 7 is a perspective view of a harrowing drag with inner ring attached.

Figure 8 is a perspective view of a weeding drag,

Figure 9 is a detail section of the weeding drag showing how the edge is sharpened, and Figure 10 is a detail section of the weeding drag illustrating an alternative sharpening of its lower end.

Referring now more particularly to the drawings, 1 indicates generally the hauling frame of the implement which is supported on wheels 2 at its rearward end, and by a hitching mechanism 3 at its forward end. The wheels 2 may be of any desired construction, but it has been found advantageous to employ that kind having cleats 4 to grip the soil, and a dog mechanism as indicated generally in Fig. 4 to allow the wheels to turn the crank member 5 only while the implement is moving forward. The crank member 5 may be supplemented at each end by extensions 6 held in place by sleeves 7 near the wheels, and bearings 8. The crank member 5 and its extensions 6 carry drag links 9 which are provided with sockets 10. Into these sockets 10 fit the bent ends of connecting rods 11 which connect the crank member and its extensions to the drags. It is to be noted that the connecting rods for the drag links and crank member are slightly longer than those connecting to the drag links of the extensions.

The connecting rods 11 are secured at their rearward ends to safety releases 12 (see Fig. 5) each of which is made up of a socket piece 13 designed to connect with connecting rods 11, and two spring members 14 of such shape that they fit over, and fasten to a balled projection 15 on the upper side of cross members 16 on drags 17.

The drags 17 may be of varied construction, for instance, should the implement be used for harrowing, the drag shown in Fig. 7 is employed. This drag consists of an outer circular frame 18 having cross bars 16. Each of these cross bars is provided with staples 19 to which chains 20 are attached. One of the crossbars has a pair of knobs 15 for attachment to the safety release links 12. Downwardly projecting spikes 21 are arranged around the circular frame. This arrangement proves very satisfactory for harrowing tough stubble. When the ground is softer an inner circular frame 22 may be secured to chains 20, the inner frame being of the same construction as the outer.

It has been found that when the implement is to be used as a weeder the drag illustrated in Fig. 8 has given the best results. This drag comprises a circular frame 18 and a pair of cross bars 16, each of which is provided with a pair of knobs 15 for attachment to safety releases 12. One side 23 of the ring 18 has its lower edge sharpened as at 24 (see Fig. 9). When the drag is operated with its sharpened edge forward the weeds are left lying scattered on top of the soil. When reversed it packs, and smoothens disked stubble without "bunching."

I claim:

1. An agricultural implement comprising a hauling frame, a circular cultivating drag, link members of substantially equal length connecting the drag to the hauling frame at two spaced points on the latter, and means on the hauling frame for imparting a reciprocating rotary motion to the drag upon forward movement of the implement.

2. An agricultural implement as defined in claim 1 wherein the drag comprises a ring with a sharpened lower edge.

3. An agricultural implement as defined in claim 1 wherein the drag comprises a pair of circular frames the smaller of which is concentrically disposed within the larger and means on said frames for acting upon the soil.

ELMER CARLSON.